United States Patent [19]
Mizuta et al.

[11] Patent Number: 5,513,952
[45] Date of Patent: May 7, 1996

[54] AXIAL FLOW COMPRESSOR

[75] Inventors: Ikuhisa Mizuta; Kaoru Chiba, both of Tokyo, Japan

[73] Assignee: Research Institute of Advanced Material Gas-Generator, Tokyo, Japan

[21] Appl. No.: 396,928

[22] Filed: Mar. 1, 1995

[30] Foreign Application Priority Data

Mar. 28, 1994 [JP] Japan .................................. 6-057886

[51] Int. Cl.$^6$ .................................................... F04D 17/00
[52] U.S. Cl. ...................... 415/182.1; 415/220; 415/914
[58] Field of Search ................................ 415/914, 182.1, 415/220

[56] References Cited

U.S. PATENT DOCUMENTS

| | | | |
|---|---|---|---|
| 2,846,137 | 8/1958 | Smith, Jr. | 415/914 |
| 4,606,699 | 8/1986 | Hemsworth | 415/914 |
| 5,275,531 | 1/1994 | Roberts | 415/914 |

FOREIGN PATENT DOCUMENTS

| | | | |
|---|---|---|---|
| 996967 | 12/1951 | France | 415/220 |
| 564336 | 9/1944 | United Kingdom | 415/914 |
| 2034435 | 6/1980 | United Kingdom | 415/914 |

*Primary Examiner*—John T. Kwon
*Attorney, Agent, or Firm*—Pearne, Gordon, McCoy & Granger

[57] ABSTRACT

An axial flow compressor is disclosed. The axial flow compressor has a casing defining a compression passage therein. The casing has an inner surface and a center axis extending along the elongated direction of the casing. A plurality of rotor blades fixed to a disk rotate in the compression passage around the center axis. Each of the rotor blades has a tip, and the tip defines a rotation area having a width extending in the direction along the center axis. A circular concavity is formed on the inner surface of the casing extending completely around the inner surface. The circular concavity has a continuous curved shape in a sectional view, and the circular concavity is formed at a portion corresponding to a front part of the rotation area of the rotor blades.

11 Claims, 4 Drawing Sheets

AXIAL FLOW COMPRESSOR

BACKGROUND OF THE INVENTION

The present invention relates to an axial flow compressor constituting, for example, a gas turbine engine, and particularly, the present invention relates to technology for increasing compression efficiency in supersonic flow by reducing the strength of the shock wave.

On an axial flow compressor part of, for example, a fan, a low pressure compressor, or a high pressure compressor of a gas turbine engine, rotor blades fixed to a disk are rotated by a shaft connected to a turbine, whereby, air is compressed and transferred backward.

In the case in which air flow reaching between the disk and the casing of the compressor flows into a rotation area of the rotor blades in a supersonic flow condition, shock waves are generated at the casing portion, whereby the speed of the air flow is rapidly reduced, and thereby the air is compressed.

However, in a compressor for a gas turbine engine or other kinds of axial flow compressors, separation of the flow tends to occur at a portion downstream adjacent to the shock wave and the compression waves, and this increases pressure loss which causes a decrease in compression efficiency.

SUMMARY OF THE INVENTION

The present invention has been developed in view of the above situation. It is an object thereof to provide an axial flow compressor for, for example, a gas turbine engine, which can improve the compression efficiency by decreasing the rapid reduction in the speed of air flow due to shock waves at the rotation area of the rotor blades by restraining the pressure loss which is caused by the shock wave itself and the separation of air flow.

In order to accomplish this object, the present invention provides

An axial flow compressor, the axial flow compressor comprising:
- a casing defining a compression passage therein, the casing having an inner surface and its center axis extending along the elongated direction of the casing; and
- a plurality of rotor blades rotating in the compression passage around the center axis, each of the rotor blades having a tip, the tips defining a rotation area having a width extending in the direction along the center axis; and
- a circular concavity formed on the inner surface of the casing extending completely around the inner surface, the circular concavity having a continuous curved shape in a sectional view, and the circular concavity being formed at a portion corresponding to a front part of the rotation area of the rotor blades.

According to the axial flow compressor of the present invention, by adopting a construction in which a circular concavity having a curved sectional shape is formed on an inner surface of the casing at a portion corresponding to a front part of the rotation area of the rotor blades, the change of speed of the air flow becomes gentle at a portion adjacent to the circular concavity, and thus, the strength of the shock wave is weakened. Therefore, it is possible to decrease the rapid reduction in the speed of air flow at the rotation area of the rotor blades, and to markedly improve the compression efficiency by restraining the pressure loss which is caused by the separation of air flow and the shock wave itself.

In the present invention, when the width of the circular concavity is 30–75% of the width of the rotation area, and when the depth of the circular concavity is 0.2–2.5% of the span of the blade, a particular effect can be obtained. In particular, the deepest portion of the circular concavity is located so as to correspond to the portion in which a shock wave will occur in the casing, and this structure achieves the most desirable effect for the present invention.

At the tip of each rotor blade, a protruding portion may be formed which conforms to the sectional shape of the circular concavity. According to this structure, the gap between the tip and the inner surface of the casing is equally spaced, and the finest effect of the present invention can be obtained.

DETAILED DESCRIPTION OF THE PREFERRED EMBODIMENTS

Figure 5:
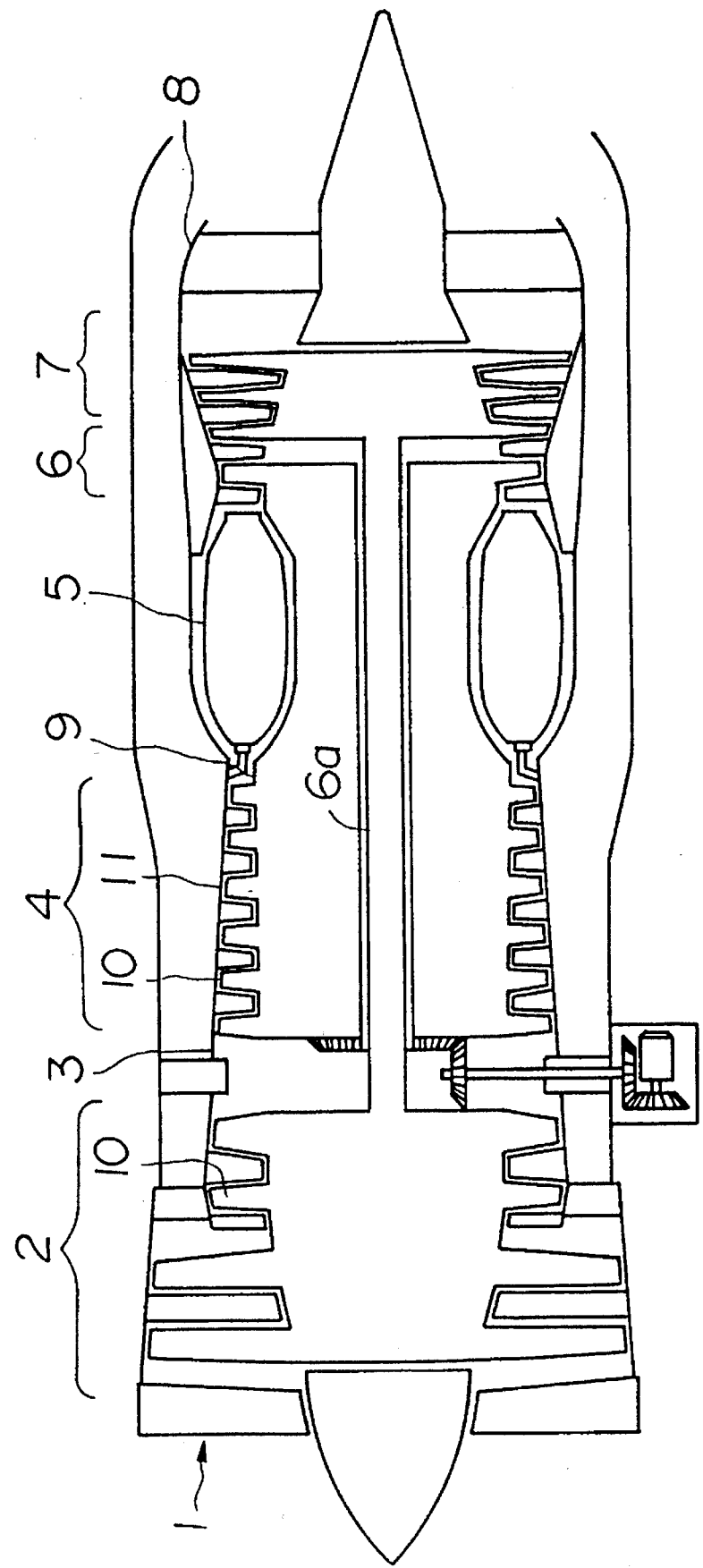
FIG. 5 is a cross sectional schematic view of a gas turbine engine.

FIG. 5 shows an example of construction of a normal gas turbine engine (turbofan engine) for an aircraft. The gas turbine engine comprises air inlets 1, a fan/low pressure compressor 2, a fan bypass duct 3, a high pressure compressor 4, combustion chambers 5, a high pressure turbine 6, a turbine shaft 6a, a low pressure turbine 7, an exhaust duct 8, rotor disks 9, rotor blades 10, and casings 11.

In an axial compressor such as the fan/low pressure compressor 2 or the high pressure compressor 4 of the gas turbine engine, rotor blades 10 are rotated by the disk 9, thereby, air is compressed and transferred backward.

In general, a plurality of rotor blades are fixed to one disk at their ends, and a plurality of such disks having the rotor blades are coaxially aligned on a center axis and constitute a rotor assembly.

In the case in which air flow reaching between the disk 9 of the compressors 2 and 4 and the casing 11 flows into a rotation area of the rotor blades 10 at supersonic flow condition, shock waves and compression waves are generated at the casing portion, whereby the speed of the air flow is reduced, and thereby air is compressed.

However, in a compressor for a gas turbine engine or other kinds of axial flow compressors, separation of the flow tends to occur at a downstream area adjacent to the shock waves and the compression waves, and this increases pressure loss which causes a decrease in the compression efficiency.

Figure 1A:
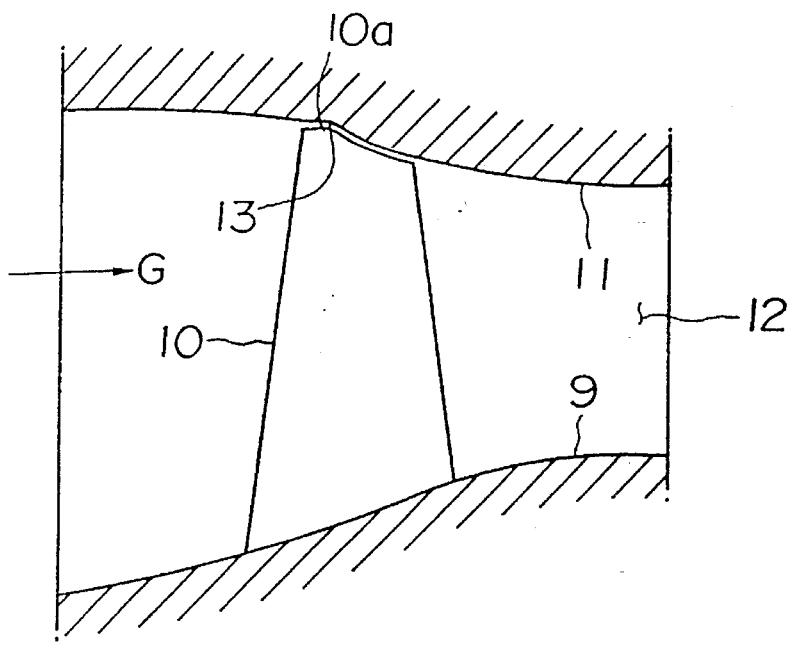
FIG. 1A is a partial sectional side view of a subject part of the axial flow compressor in accordance with an embodiment of the present invention.
Figure 1B:
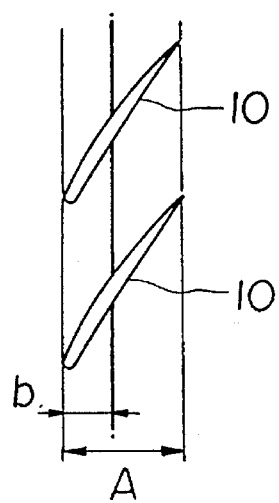
FIG. 1B is a partial schematic view of the rotor blade row.
Figure 1C:
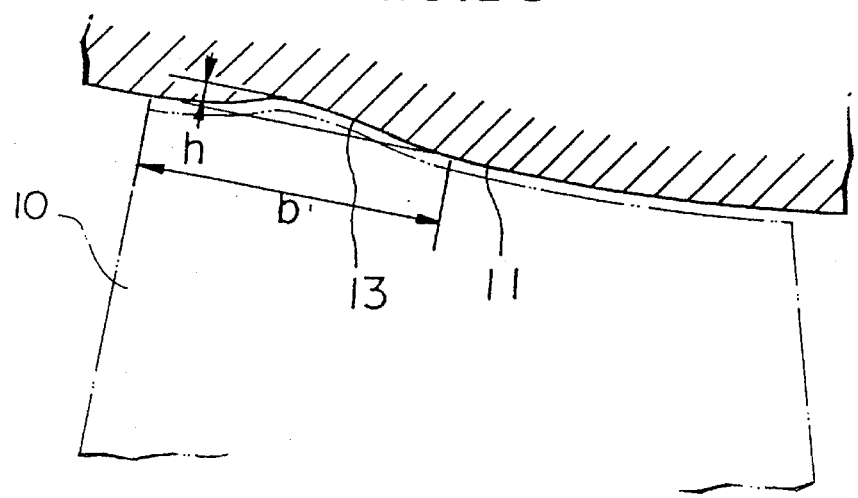
FIG. 1C is an enlarged view of a casing inner side portion of FIG. 1A.

FIG. 1A shows a subject part of the high pressure compressor 4 (axial flow compressor) in accordance with an embodiment of the present invention. As shown in FIG. 1A, a compression passage 12 is defined between the disk 9 and the casing 11, and rotor blades 10 fixed on the disk 9 are located in the compression passage 12. As shown in FIG. 1A, a circular concavity 13 is formed on an inner surface of the casing 11. The circular concavity 13 extends completely around the inner surface of the casing, and is formed, as shown in FIG. 1B, at a front portion of a rotation area A of the rotor blades 10. FIG. 1C shows an enlarged sectional shape of the circular concavity 13. As shown in FIG. 1C, the circular concavity 13 has the sectional shape of a shallow and continuous curve. Furthermore, the circular concavity 13 is formed so that the deepest portion thereof is located so as to correspond to the portion in which a shock wave will occur in the casing.

On the other hand, as shown in FIG. 1A, at the tip of each of the rotor blades 10, a protruding portion 10a is formed to conform to the surface of the circular concavity 13 so that a gap between the tip and the inner surface of the casing 11 is equally spaced.

Figure 2:
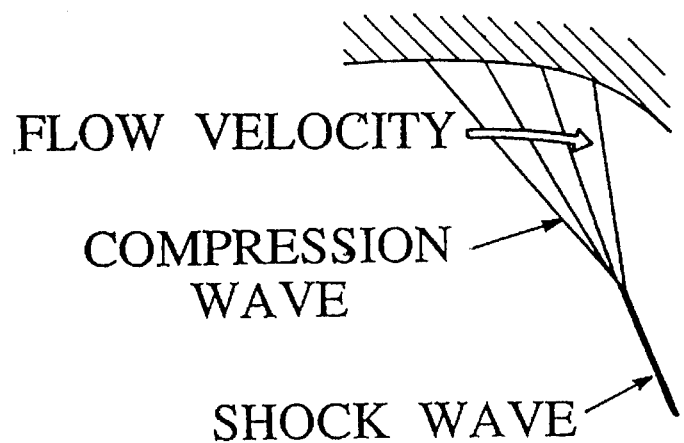
FIG. 2 is an enlarged view showing a shock wave and compression waves occurring at the curvature of the concave inner surface of the casing shown in FIG. 1C.

In the case in which the relative speed of airflow G (FIG. 1A) adjacent to the tip of the rotor blade 10 is supersonic, a shock wave and compression waves occur, as shown in FIG. 2, at a portion in which the curvature of the concave inner surface of the casing 11 changes, and inflowing air is compressed by reduction of its flow speed and by the rotation of the rotor blades.

According to the inventors' analysis of the relationship between the rotor blades 10 and the circular concavity 13 shown in FIG. 1A, it was recognized that, when the depth of the circular concavity h is 0.2–2.5% of the span of the blade, and the width of the circular concavity b is 30–75% of the rotation area A of the rotor blade, the advantage of improved performance can be obtained in accordance with the present invention.

Figure 3:
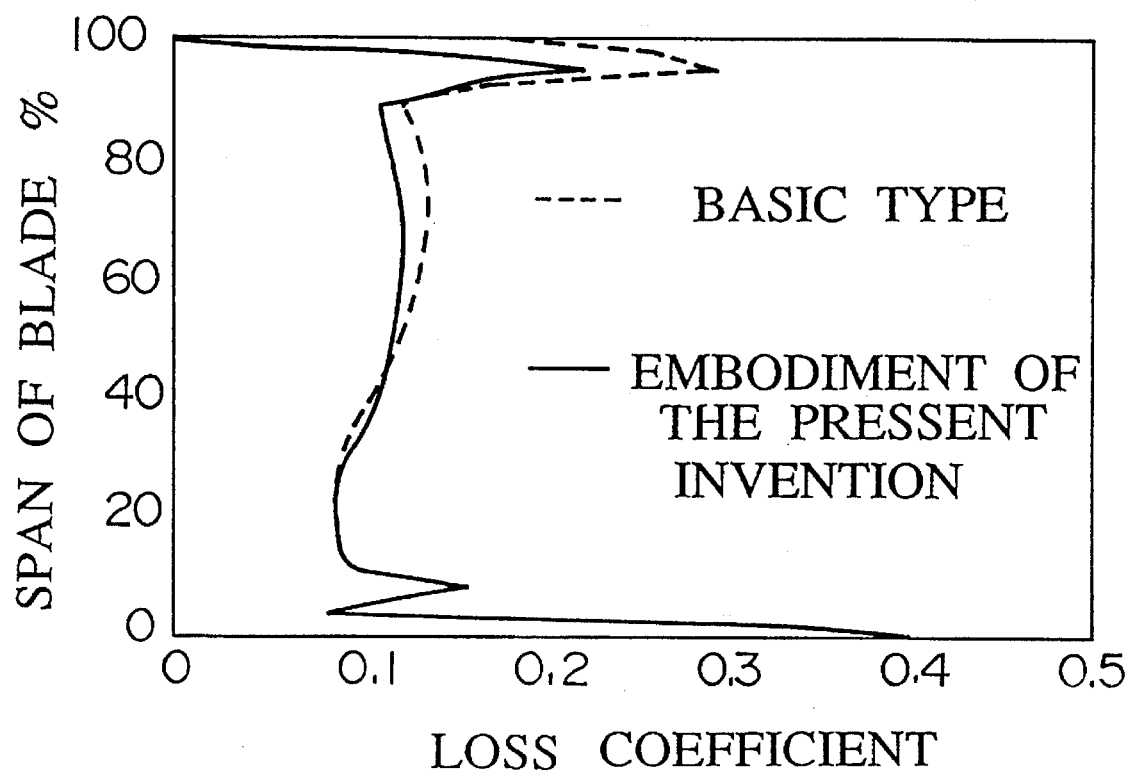
FIG. 3 is a graph showing the relationships between the span of the rotor blades and the loss coefficient of an axial flow compressor of basic type and an axial flow compressor in accordance with the present invention.

FIG. 3 shows the result of an analysis of the relationship between the span of the rotor blades 10 and loss coefficient of the casing without the circular concavity (i.e., basic type casing) and the casing with the circular concavity 13, with the conditions that span of blade: 185 mm, chord of blade: 110 mm, width of rotation area A: 47 mm, depth of circular concavity h: 2.5 mm, and width of circular concavity b: 30 mm. In this case, the term "span" means the length of a blade in the radial direction, and the term "chord" means the dimension between the leading edge and the trailing edge of a blade. Of course, this represents only one example out of many possible variations on the resent invention, and the various features of the present invention need not be restricted to the values shown.

Making a comparison between the basic type casing shown by a dotted line and the casing of the embodiment in accordance with the present invention shown by a solid line, it is apparent that the loss coefficient on the casing of the embodiment of the present invention is smaller than that of the basic type casing at an upper half portion of the span of the rotor blades, after which the difference between the dotted line and the solid line becomes larger, and thus the occurrence of air compression loss is reduced.

Figure 4A:
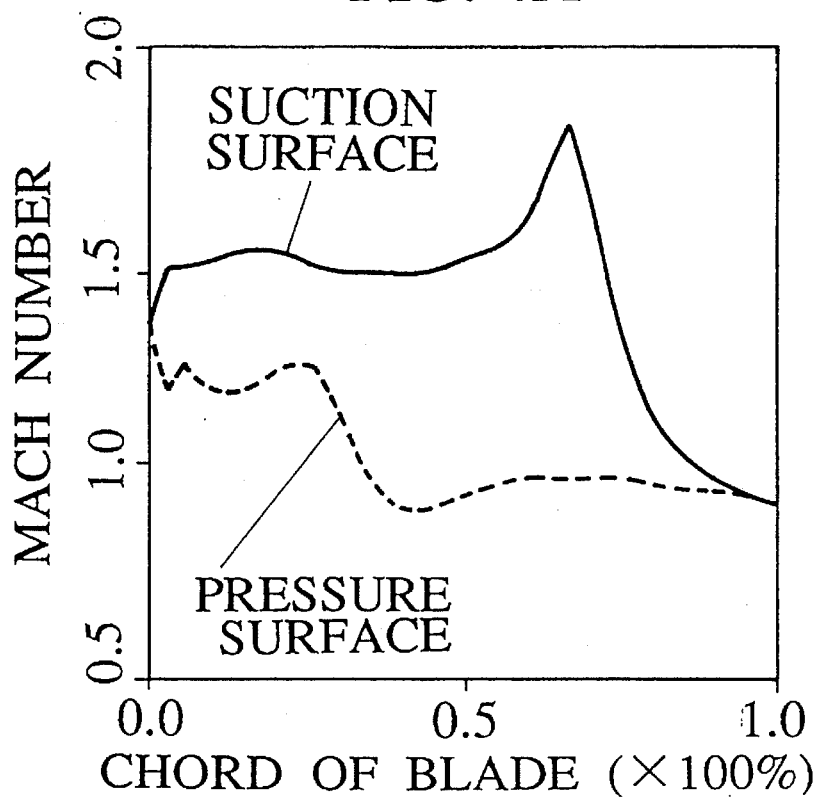
FIG. 4A is a graph showing the relationship between the chord of a rotor blade and the blade surface Mach number of a basic type axial flow compressor.
Figure 4B:
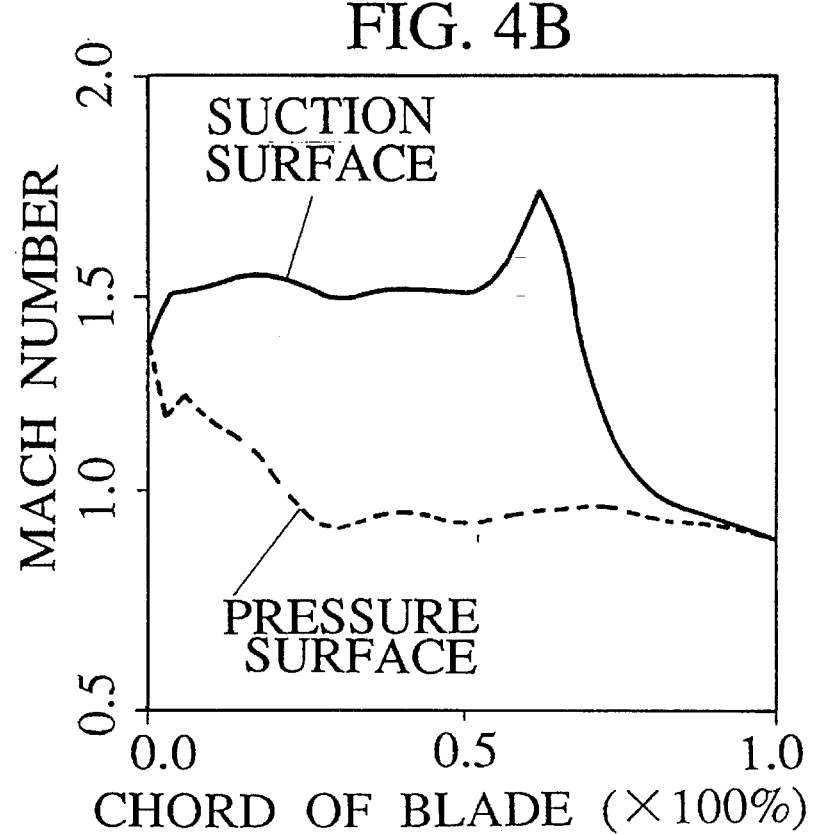
FIG. 4B is a graph showing the relationship between the chord of a rotor blade and the blade surface Mach number of a casing in accordance with the present invention.

FIG. 4A shows the result of the analysis of the relationship between the chord of the rotor blades 10 and the blade surface Mach number of the basic type casing; and FIG. 4B shows the result in the case of the casing with the circular concavity 13.

Making a comparison between the basic casing shown in FIG. 4A and the casing shown in FIG. 4B regarding the suction surface, the peak Mach number before the shock wave of the casing 11 with the circular concavity 13 is more restricted, as shown in FIG. 4B, than that of the casing of basic type shown in FIG. 4A. Furthermore, comparing both casings concerning the pressure surface, the change of speed of the air flow of the casing shown in FIG. 4B becomes gentle particularly near a shock wave. Therefore, it can be understood that, with the axial flow compressor in accordance with the present invention, the strength of the shock wave is reduced, and air compression is smoothly achieved.

For rotor blades having particular shapes and dimensions which are different from the one shown in FIG. 1, the depth h and the width b of the circular concavity 13 may be defined in association with the shapes, spans, and chords of the rotor blades. For instance, the dimension ranges of the depth h and the width b may be changed relative to the chord or rotation area, and then optimum conditions may be selected in those ranges.

Lastly, though the present invention has been explained, in the preferred embodiment described the above, in reference to an axial flow compressor for a turbo fan engine, one skilled in the art would understand that the present invention is also applicable and effective for, for example, an axial flow compressor for a gas turbine engine used for a generator, or other types of axial flow compressors.

What is claimed is:

1. An axial flow compressor, said axial flow compressor comprising:

a casing defining a compression passage therein, said casing having an inner surface and a center axis extending along the elongated direction of said casing;

a plurality of rotor blades rotating in said compression passage around said center axis, each of said rotor blades having a tip and a span, said tips defining a rotation area having a width extending in the direction along said center axis; and a circular concavity formed on said inner surface of said casing extending completely around said inner surface, said circular concavity having a continuous curved shape in a sectional view, said circular concavity being formed at a portion corresponding to a front part of said rotation area of said rotor blades, the depth of said circular concavity being 0.2–2.5% of said span of said blade, and the deepest portion of said circular concavity being located corresponding to the portion in which a shock wave will occur in said casing.

2. An axial flow compressor according to claim 1, wherein the width of said circular concavity is 30–75% of the width of said rotation area.

3. An axial flow compressor according to claim 2, wherein the width of said circular concavity is approximately half of the width of said rotation area.

4. An axial flow compressor according to claim 1, wherein a protruding portion is formed at each tip of said rotor blade conforming to said sectional shape of said circular concavity so that a gap between said tip and said inner surface of said casing is equally spaced.

5. An axial flow compressor according to claim 1, wherein said axial flow compressor is for a gas turbine engine.

6. An axial flow compressor according to claim 5, wherein said gas turbine engine is for a propulsion engine.

7. An axial flow compressor according to claim 6, wherein said propulsion engine is a turbo fan engine.

8. An axial flow compressor according to claim 7, wherein said axial flow compressor is for a fan of said turbo fan engine.

9. An axial flow compressor according to claim 7, wherein said axial flow compressor is for a low pressure compressor of said turbo fan engine.

10. An axial flow compressor according to claim 7, wherein said axial flow compressor is for a high pressure compressor of said turbo fan engine.

11. An axial flow compressor according to claim 5, wherein said gas turbine engine is for a generator.

* * * * *